(12) United States Patent
Ulman et al.

(10) Patent No.: US 11,899,547 B2
(45) Date of Patent: Feb. 13, 2024

(54) TRANSACTION BASED FAULT TOLERANT COMPUTING SYSTEM

(71) Applicant: MELLANOX TECHNOLOGIES, LTD., Yokneam (IL)

(72) Inventors: Sharon Ulman, Hayogev (IL); Eyal Srebro, Kfar Yehoshua (IL); Shay Aisman, Zichron Yaakov (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/537,543

(22) Filed: Nov. 30, 2021

(65) Prior Publication Data

US 2023/0168978 A1 Jun. 1, 2023

(51) Int. Cl.
*G06F 11/16* (2006.01)
*G06F 11/20* (2006.01)
*G06F 11/07* (2006.01)
*G06F 11/14* (2006.01)

(52) U.S. Cl.
CPC ...... *G06F 11/1695* (2013.01); *G06F 11/0757* (2013.01); *G06F 11/0772* (2013.01); *G06F 11/0793* (2013.01); *G06F 11/1474* (2013.01); *G06F 11/1641* (2013.01); *G06F 11/1658* (2013.01); *G06F 11/2028* (2013.01)

(58) Field of Classification Search
CPC ............ G06F 11/1695; G06F 11/0757; G06F 11/0772; G06F 11/0793; G06F 11/1474; G06F 11/1641; G06F 11/1658; G06F 11/2028
See application file for complete search history.

(56) References Cited

U.S. PATENT DOCUMENTS

| | | | |
|---|---|---|---|
| 5,956,474 A | 9/1999 | Bissett et al. | |
| 7,308,566 B2 | 12/2007 | Michaelis et al. | |
| 7,366,948 B2 | 4/2008 | Michaelis et al. | |
| 9,734,190 B1 * | 8/2017 | Holenstein | G06F 11/1474 |
| 10,452,648 B1 * | 10/2019 | Holenstein | G06F 16/2379 |
| 11,409,688 B1 * | 8/2022 | Peterson | G06F 13/4221 |
| 2008/0163035 A1 * | 7/2008 | Kottke | G06F 9/3851 712/30 |
| 2015/0046758 A1 * | 2/2015 | Cain, III | G06F 11/181 714/49 |

(Continued)

OTHER PUBLICATIONS

Wei Song, "Error Detection by Redundant Transaction in Transactional Memory System",2011 Sixth IEEE International Conference on Networking, Architecture, and Storage, pp. 220-224 (Year: 2011).*

(Continued)

*Primary Examiner* — Bryce P Bonzo
*Assistant Examiner* — Michael Xu
(74) *Attorney, Agent, or Firm* — Kligler & Associates Patent Attorneys Ltd.

(57) ABSTRACT

A computing apparatus includes a transaction-record memory and a comparator. The transaction-record memory is to receive and store one or more sequences of transaction records, each transaction record including a unique transaction ID and a transaction payload. The comparator is to compare the payloads of transaction records having the same transaction ID, and to initiate a responsive action in response to a discrepancy between the compared transaction payloads.

20 Claims, 6 Drawing Sheets

(56) References Cited

U.S. PATENT DOCUMENTS

| | | | |
|---|---|---|---|
| 2015/0067278 A1* | 3/2015 | Gurumurthi | G06F 12/0811 |
| | | | 711/154 |
| 2016/0092320 A1* | 3/2016 | Baca | G06F 11/1641 |
| | | | 714/49 |
| 2018/0011914 A1* | 1/2018 | Doherty | G06F 12/0815 |
| 2018/0024896 A1* | 1/2018 | Yamabiraki | G06F 11/2048 |
| | | | 714/12 |
| 2020/0195493 A1* | 6/2020 | Hall | G06F 11/165 |
| 2020/0272535 A1* | 8/2020 | Xu | G06F 11/1004 |

OTHER PUBLICATIONS

Wei Song, "Error Detection by Redundant Transaction in Transactional Memory System",2011,2011 Sixth IEEE International Conference on Networking, Architecture, and Storage, pp. 220-224—https://ieeexplore.ieee.org/document/6005464 (Year: 2011).*

Kuan-Hsun Chen, J.-J. Chen, F. Kriebel, S. Rehman, M. Shafique and J. Henkel, "Task Mapping for Redundant Multithreading in Multi-Cores with Reliability and Performance Heterogeneity," in IEEE Transactions on Computers, vol. 65, No. 11, pp. 3441-3455, Nov. 1, 2016, doi: 10.1109/TC.2016.2532862. (Year: 2016).*

* cited by examiner

TRANSACTION BASED FAULT TOLERANT COMPUTING SYSTEM

FIELD OF THE INVENTION

The present invention relates generally to fault-tolerant computing, and particularly to improved methods and systems for lockstep fault tolerant computing.

BACKGROUND OF THE INVENTION

In various fault tolerant computing systems, fault resiliency is achieved by comparing the outputs of a plurality of processors that execute the same task.

For example, U.S. Pat. No. 5,956,474 describes a fault resilient or fault tolerant computer that is produced by designating a first processor as a computing element, designating a second processor as a controller, connecting the computing element and the controller to produce a modular pair, and connecting at least two module pairs to produce a fault resilient or fault tolerant computer. Each computing element of the computer performs all instructions in the same number of cycles as the other computing element. The controllers provide input/output processing for the computing elements, as well as monitor their operations to detect errors, and control operation of the computing elements in response to the detected errors.

U.S. Pat. No. 7,366,948 describes a system and method for maintaining in a multi-processor system a spare processor that is in lockstep for use in recovering from loss of lockstep for another processor. According to one embodiment, a method comprises assigning a first processor of a multi-processor system a role of spare processor for at least a second processor, and responsive to detecting loss of lockstep (LOL) for any of the at least a second processor, the first processor replaces the processor for which the LOL is detected. The method further comprises reestablishing lockstep for the processor for which the LOL is detected, and assigning the processor having its lockstep reestablished the role of spare processor for at least the first processor.

Lastly, U.S. Pat. No. 7,308,566 describes a system and method for configuring lockstep mode of a processor module. A system comprises a processor module that supports lockstep mode of operation. The system further comprises non-volatile data storage having stored thereto configuration information specifying whether the processor module is desired to operate in lockstep mode. A method comprises storing configuration information to non-volatile data storage of a system, wherein the configuration information specifies whether lockstep mode of operation is desired to be enabled or disabled for a processor module of the system. The method further comprises causing, by the system, the processor module to have its lockstep mode enabled or disabled as specified by the configuration information.

SUMMARY OF THE INVENTION

An embodiment of the present invention that is described herein provides a computing apparatus including a transaction-record memory and a comparator. The transaction-record memory is to receive and store one or more sequences of transaction records, each transaction record including a unique transaction ID and a transaction payload. The comparator is to compare the payloads of transaction records having the same transaction ID, and to initiate a responsive action in response to a discrepancy between the compared transaction payloads.

In an embodiment, the comparator is to, responsively to receiving a transaction record, compare the ID of the transaction record to IDs of transaction records stored in the transaction-record memory. In another embodiment, the comparator is to, responsively to receiving a transaction record having an ID that is identical to an ID of a transaction record that is stored in the transaction-record memory, compare the transaction record to the corresponding stored transaction record and initiate the responsive action in response to a discrepancy between the transaction record and the stored transaction record.

In some embodiments, the computing apparatus further includes a safety controller, and the comparator is to initiate the responsive action by issuing an alert to the safety controller. In an example embodiment, the safety controller circuit includes a processor, and the comparator is to issue the alert by asserting an interrupt input of the processor.

In a disclosed embodiment, the comparator is to, responsively to receiving a transaction record having an ID that is identical to the ID of a stored transaction record in the transaction-record memory, compare the transaction record to the stored transaction record, and remove the corresponding transaction record from the transaction-record memory in response to a match between the transaction record and the stored transaction record. In an embodiment, the transaction-records memory is a hash-based transaction-records memory.

In some embodiments, the computing apparatus further includes at least two functionally equivalent processing cores, to execute identical tasks, each processing core to output a respective sequence of the transaction records. In an embodiment, at least two of the processing cores are not synchronized to each other. In another embodiment, at least one of the processing cores has a non-deterministic processing latency in performing the processing task. In yet another embodiment, one of the processing cores is collocated with the transaction-record memory and the comparator, and another of the processing cores is remote from the transaction-record memory and the comparator. In still another embodiment, one or more of the processing cores are comprised in a network device, and the transaction records include communication traffic processed by the network device.

There is additionally provided, in accordance with an embodiment of the present invention, a computing method including receiving and storing one or more sequences of transaction records, each transaction record including a unique transaction ID and a transaction payload. The payloads of transaction records having the same transaction ID are compared. A responsive action is initiated in response to a discrepancy between the compared transaction payloads.

The present invention will be more fully understood from the following detailed description of the embodiments thereof, taken together with the drawings in which:

DETAILED DESCRIPTION OF EMBODIMENTS

Overview

Computer systems used in critical applications, such as autonomous driving or life support, sometimes use duplicate circuitry. For example, two or more redundant identical computers may be used, wherein the outputs of computers are compared by high reliability circuitry, and a corrective action takes place if the outputs of the redundant computers do not match.

"Multi lockstep" is a technique in which two or more redundant computers are configured to run identical programs, in small interval steps, and wherein the equality of the computers' output is checked after every interval. (We will refer hereinbelow to a datum that a redundant computer outputs as a "transaction"; in a multi lockstep system, transactions of redundant computers are checked for equality).

In some applications, the redundant computers, although identical, may have slight timing variations (in other words—may not be synchronized relative to one another). For example, two computers may output the same transaction in close temporal proximity but not at the exact same time (in other words, the two computers may not be fully synchronized). In other applications, the two computers may output the same group of transactions, but in a different order. Although such variations in timing and order are typically permissible, conventional lockstep techniques are likely to incorrectly regard them as erroneous.

We will refer hereinbelow to the redundant computers as redundant processing cores, or simply processing cores.

Embodiments of the present invention that are described herein provide methods and systems in which the output transactions of functionally-equivalent processing cores are compared, allowing for different timing and for different transaction ordering. We will refer to processing cores that generate the same output, albeit possibly asynchronously or out-of-order with respect to each other, as functionally equivalent. In an embodiment, the processing cores attach ID indications to transactions, and a Transaction Comparator Circuit (TCC) compares same-ID transactions that the processing cores send, allowing for differences in the time of arrival and in the order of the transactions (The TCC will also be referred to as the Computing Apparatus hereinbelow).

In some embodiments, if the TCC detects a discrepancy between transactions having the same ID, the TCC indicates a safety failure to a safety controller, which may then take a corrective action.

In an embodiment, the TCC comprises a transaction-record memory ("memory") that is configured to store a predefined number of transactions. In some embodiments there are two processing cores, and the TCC is configured to store, for each ID, the transaction that the TCC receives first; when the TCC receives a second transaction having the same ID, the TCC compares the two transactions, and sends a safety failure indication if the transactions are not equal. In some embodiments, if the transactions are equal, the TCC marks the storage location where the transaction is stored as empty and may reuse the location for further transactions.

In various embodiments, the location in memory in which the TCC stores a transaction is directly derived from the transaction ID (e.g., a transaction with ID=7 will be stored in location 7 of the TCC memory). In other embodiments, the TCC may store transactions at a location in memory which is derived by a hash function from the transactions' ID. In embodiments, the TCC stores a signature (e.g., a hash function) of the transaction and compares the stored signature to the signature of a same-ID transaction.

In some embodiments, the computing device includes a first processing core, and an input interface to receive transactions from an external second processing core that is functionally identical to the first processing core. When no processing core is coupled to the input interface, the TCC will comprise a non-fault-tolerant computing system; when the second processing core is coupled to the input interface, the TCC will comprise a fault-tolerant computing system.

In other embodiments, the TCC comprises two or more processing cores, and comprises a fault-tolerant computing system. In yet other embodiments, all the processing cores are located remotely from TCC.

In an embodiment, a network device comprises duplicate egress datapaths operating in lockstep. The network device comprises a primary egress datapath from a peripheral component interconnect express (PCIe) interface to a network; an identical duplicate egress datapath; and a TCC that compares packets that the primary datapath sends over the network to packets that the duplicate datapath generates.

In another embodiment, a network device comprises duplicate ingress datapaths operating in lockstep. The network device comprises a primary ingress datapath from a network to a PCIe interface; an identical duplicate ingress datapath; and a TCC that compares data that the primary datapath sends to the PCIe interface to data that the duplicate datapath generates.

Thus, according to embodiments, high reliability multi lockstep computer systems may compare transactions generated by functionally-equivalent processing cores, which are possibly generated at different times and/or in different orders.

SYSTEM DESCRIPTION

Fault tolerant computing systems are used in high reliability applications, such as autonomous driving and life support. One way to achieve fault tolerant computing is to have two or more identical processing cores, and circuitry that compares the outputs of the processing cores. In case the outputs do not match, a corrective action may take place (e.g., alerting a user). The term Lockstep System refers to a fault-tolerant computer system comprising a plurality of identical processing cores.

The processing cores execute the same set of operations at the same time in parallel and, hence, are expected to generate the same outputs. This allows error detection and error correction: the outputs from lockstep operations executed by the processing cores can be compared to determine whether a fault has occurred (if there are at least two processing cores); the error can be automatically corrected if there are at least three processing cores, via majority vote. (We will refer to outputs that the processing cores generate as output transactions; this may include complete communication packets, as well as discrete output busses and signals.)

However, in practice, the processing cores are not necessarily completely identical. For example, inter-clock-domain synchronization circuits may exhibit different delays, and real random number generators may produce different results. These minute differences between the processing cores may result in different timing of the output transactions; moreover, due to the parallel processing nature in each processing core, the order of the transactions sent by different processing cores may be different. For example, a first processing core may output a transaction A followed by a transaction B, whereas a second processor may send the exact same A and B transactions, but with transaction B first, followed by transaction A. We will refer to processing cores that generate the same output, albeit possibly asynchronously or out-of-order with respect to each other, as functionally equivalent.

Embodiments of the present invention efficiently compare such time-offset and/or out-of-order transactions.

Figure 1:
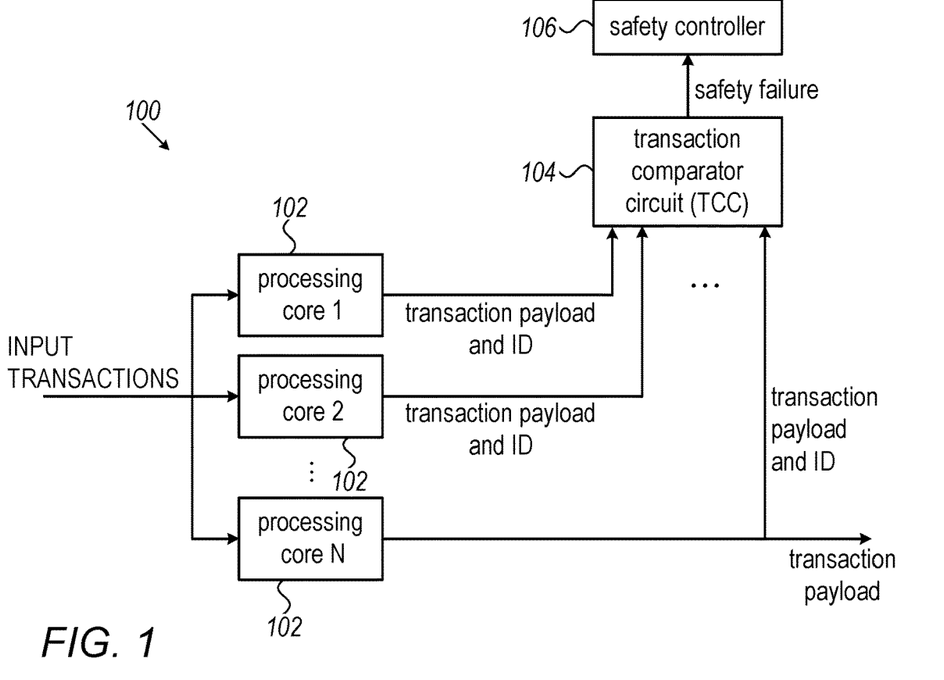
FIG. 1 is a block diagram that schematically illustrates a fault-tolerant computing system, in accordance with an embodiment of the present invention.

FIG. 1 is a block diagram that schematically illustrates a fault-tolerant computing system 100, in accordance with an embodiment of the present invention. The computing system comprises a plurality of functionally-equivalent processing cores 102 that are configured to receive the same input (input transactions).

To allow comparison of out-of-order transactions at the outputs of processing cores 102, the processing cores add a unique ID to each transaction (the same IDs may be reused after a predefined time-period). The transactions that the processing cores output and the corresponding IDs are input to a transaction comparator circuit (TCC) 104 (which will also be referred to as a Computing Apparatus), which is configured to compare transactions that have the same ID, irrespectively of the order in which the transactions are input.

Responsively to a mismatch between transactions that have the same ID, the TCC sends a safety failure indication to a safety controller 106, which is configured to take a corrective action.

The response of the safety controller to a safety failure indication is beyond the scope of the present disclosure. Typically, when there are more than two processing cores, the safety controller may decide which of the transactions should be used by a majority vote, and when there are only two processing cores, a user may be alerted.

In some embodiments, safety controller 106 and one of processing cores 102 are embedded within TCC 104, which further comprises an input interface to receive transactions from the other processing cores 102. If no other processing core is connected to the input interface, TCC 104 will comprise a non-fault-tolerant computing system; if other processing cores are connected to the input interface, TCC 104 will comprise a fault-tolerant computing system.

In other embodiments, safety controller 106 and two or more processing cores are embedded within TCC 104, which comprises a fault-tolerant computing system.

In yet other embodiments, all processing cores 102 are located remotely from TCC 104.

The configuration of fault-tolerant computing system 100 illustrated in FIG. 1 and described hereinabove is cited by way of example. Other suitable configurations may be used in alternative embodiments. For example, in some embodiments, the TCC may measure a time-difference between the receiving of same-ID transactions and indicate a failure if the time difference is higher than a preset threshold.

In embodiments, TCC 104 comprises a memory that stores recent transactions. In some embodiments, the ID of the transaction is used as an index into the memory; for example, a transaction with ID=24 will be stored in address 24 of the TCC memory. In other embodiments, the ID size may be too large (e.g., a 32-bit ID will require a 4G-enries memory), and a hashing function is applied to the ID, to generate a reduced-size index. We will refer to a TCC in which the transaction ID directly accesses the transaction memory as "ID-indexed TCC", and to a TCC in which the access is hashed as "hash-indexed TCC".

In some embodiments, the size of the transactions may be large, and a hashing function is applied to the transaction payload, to generate a payload signature; a TCC with hashed payload will be referred to as "hashed-payload TCC".

Figure 2:
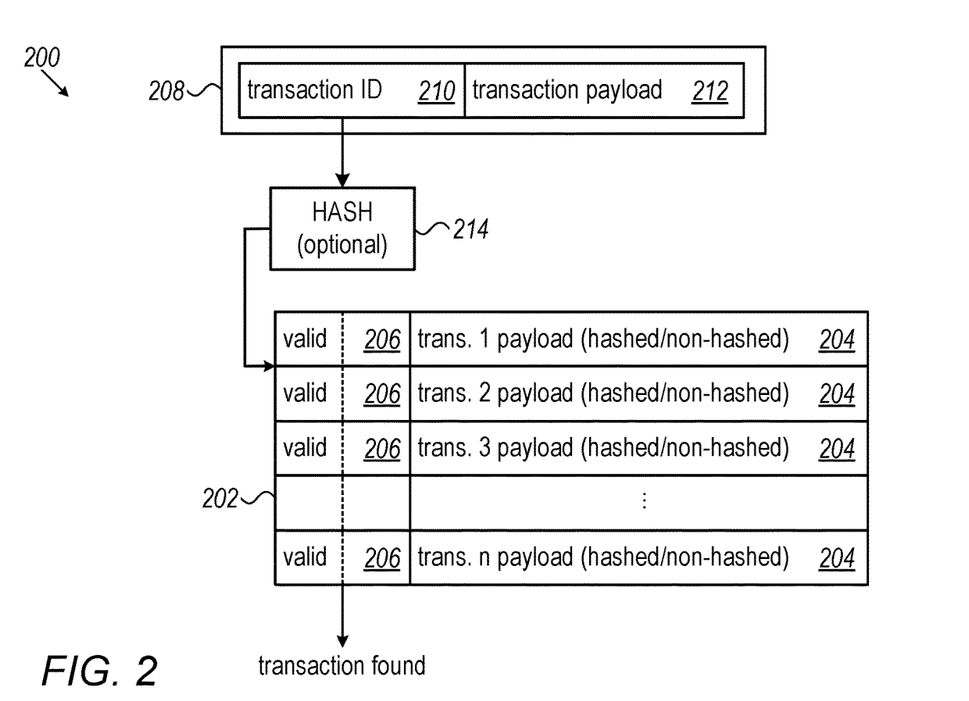
FIG. 2 is a block diagram that schematically describes a mechanism for detecting whether a transaction is stored in the memory of a transaction comparator circuit (TCC), in accordance with an embodiment of the present invention.

FIG. 2 is a block diagram that schematically describes a mechanism 200 for detecting whether a transaction is stored in the memory of a transaction comparator circuit (TCC), in accordance with an embodiment of the present invention. According to the example embodiment illustrated in FIG. 2, the TCC comprises a memory 202, which is configured to store either the transaction payloads (e.g., the transaction without the ID), or hash values of the transaction payloads. The payloads (or the hash functions thereof) are stored in entries 204 of the memory. In an embodiment, the transaction IDs are used as an index into memory 202 and, thus, the number of entries in the memory is equal to the number of possible transaction IDs. In another embodiment, the transaction ID is input to a Hash circuit 214, which is configured to generate a shorter (having less bits) representation of the ID field; the hash representation is then used as an index into memory 202.

Each entry 204 further comprises a valid field, which can be set or cleared. A set valid field indicates that the corresponding entry is used, whereas a clear valid field indicates that the entry is not used. In some embodiment the valid field comprises a single bit.

A transaction record 208 that the TCC receives comprises a transaction ID 210, and a transaction payload 212. When the TCC receives a transaction, the TCC first accesses memory 202, with index that is equal to the transaction ID (or, alternatively, an index that is equal to a hash representation of the transaction ID). The TCC then checks the corresponding valid field to see if the corresponding memory entry is valid.

Responsively to the valid field value, the TCC will either: i) if the valid field is set—compare the transaction to a corresponding stored transaction; or, ii)—if the valid field is cleared—add the new transaction to memory 202.

Figure 3A:
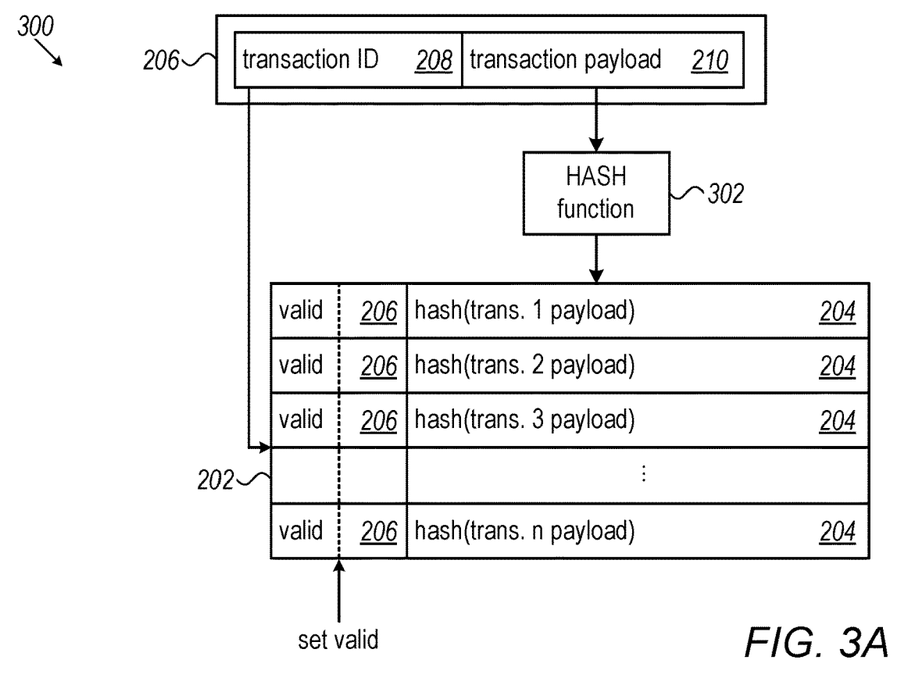
FIG. 3A is a block diagram that schematically illustrates adding a new entry in an ID-indexed, hash-payload TCC, in accordance with an embodiment of the present invention.

FIG. 3A is a block diagram 300 that schematically illustrates adding a new entry in an ID-indexed, hash-payload TCC, in accordance with an embodiment of the present invention. When a new transaction is input to the TCC and the corresponding valid field is cleared, (indicating that the corresponding entry is not valid), the TCC activates a hash function 302 on the payload of the transaction, to generate a shorter (typically fixed size) representation of the payload. The TCC then stores the hash value in the RAM 202 entry that is indexed by the transaction ID.

In parallel, the TCC sets the valid field (206) corresponding to the transaction ID, to indicate that the corresponding entry 204 is now valid.

Figure 3B:
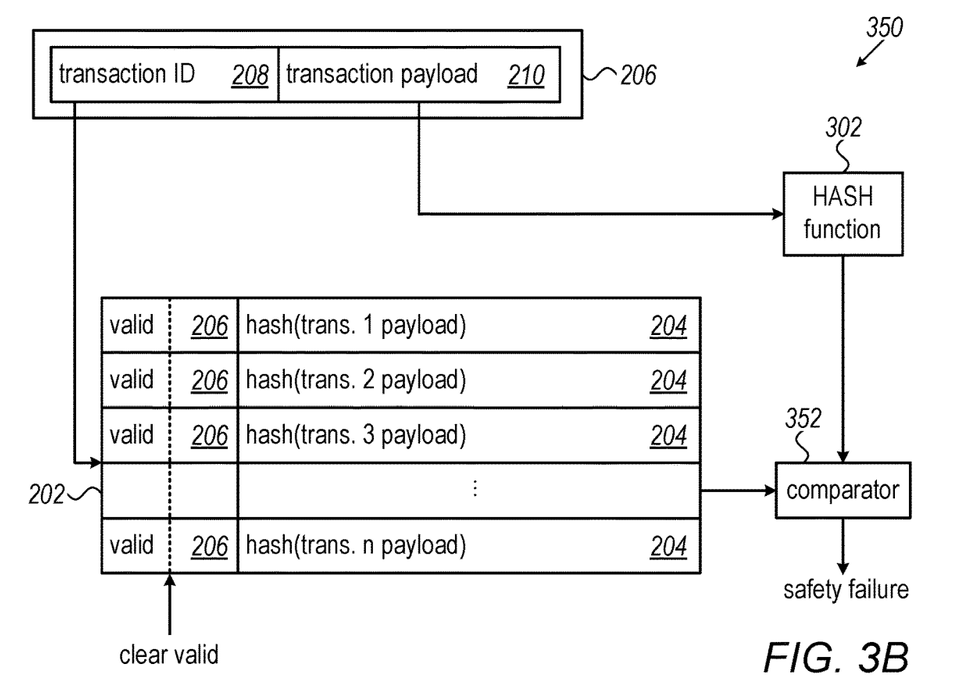
FIG. 3B is a block diagram that schematically illustrates adding a new entry in an ID-indexed, hash-payload TCC, in accordance with an embodiment of the present invention.

FIG. 3B is a block diagram 350 that schematically illustrates adding a new entry in an ID-indexed, hash-payload TCC, in accordance with an embodiment of the present invention. When an entry 204 that corresponds to a transaction ID is valid (as indicated by valid field 206), the TCC activates hash function 302 to generate the hash representation of payload 210. A comparator 352 then compares the hash value 204 that is stored in the entry to the hash representation. If the hash functions are not equal, the TCC sends a safety-failure indication to safety controller 106 (FIG. 1).

Figure 4:
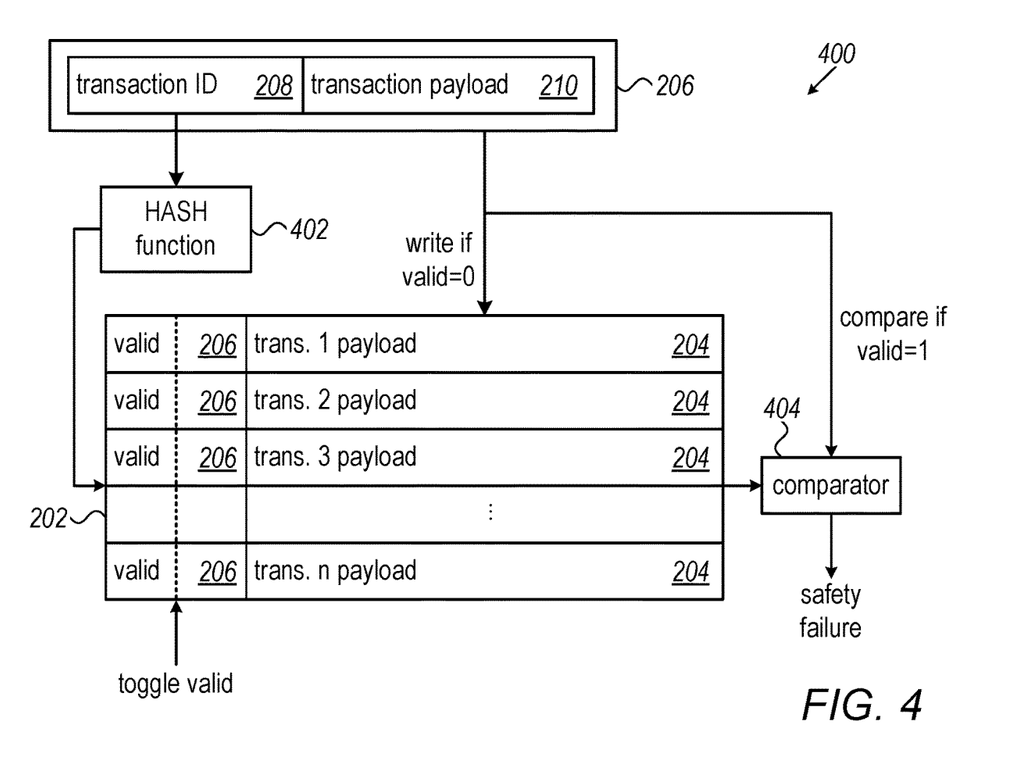
FIG. 4 is a block diagram that schematically illustrates a hash-indexed, non-hashed-payload TCC, in accordance with an embodiment of the present invention.

FIG. 4 is a block diagram 400 that schematically illustrates a hash-indexed, non-hashed-payload TCC, in accordance with an embodiment of the present invention. The ID part of an input transaction is input to a hash circuit 402, which generates a hash representation of the transaction ID. The TCC first checks if the corresponding valid field is set (as described with reference to FIG. 2). If the valid field is set, indicating that an entry corresponding to the ID of the input transaction is already stored in memory, a comparator 404 will compare the stored transaction payload 204 with the input transaction payload 210; if the two payloads are not identical, the TCC will send a safety failure indication to safety controller 106 (FIG. 1).

If the valid field is cleared (e.g., a transaction corresponding to the input transaction ID 208 is not stored in memory 202), the TCC writes the payload of the input transaction in an entry 204 of memory 202, at the location indicated by the hashed ID of the input transaction.

The TCC also toggles the valid field of the entry pointed to by the hashed representation of the transaction ID—if the valid field is set, indicating that an entry corresponding to the input transaction ID is stored in memory, the TCC will compare the stored payload with the input payload; thereafter the entry will not be needed; the TCC will clear the valid field, to indicate that the entry can be reused for further transactions. If the valid field is cleared (indicating that no entry corresponding to the transaction ID is stored in memory), the TCC will write the new payload in memory, and set the valid field to indicate that the entry is now in use.

The configurations of TCC 104 illustrated in FIGS. 2 through 4 and described hereinabove are example configurations that are cited for conceptual clarity. Other suitable configurations may be used in alternative embodiments. For example, hashing may be used in either or both the ID and the payload fields, or not used. In embodiments with more than two processing cores the valid field may indicate validity per processing core, the comparison may be replicated, and a majority circuit may be added.

Figure 5:
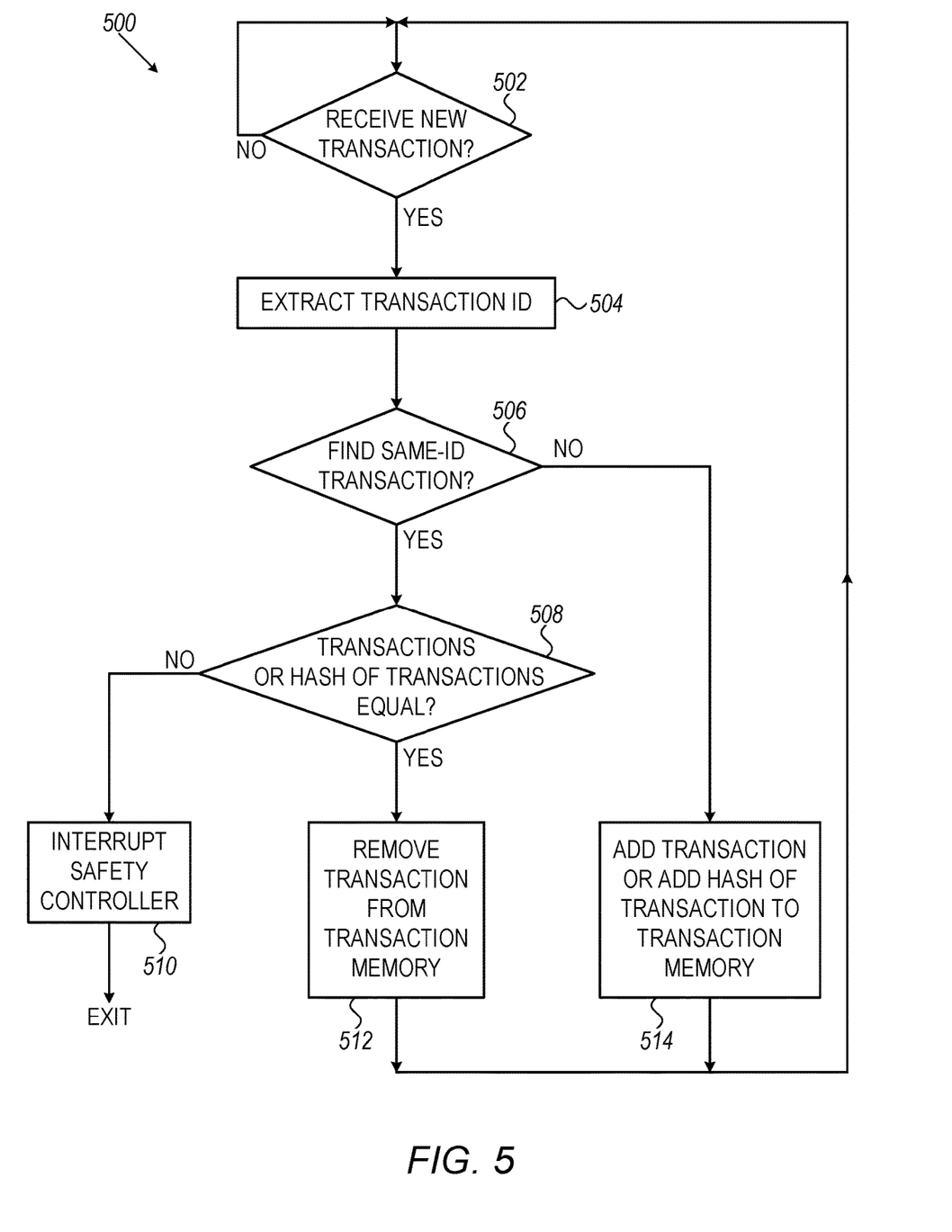
FIG. 5 is a flowchart that schematically describes a method for transaction comparison in a transaction-based dual lockstep computing system, in accordance with an embodiment of the present invention.

FIG. 5 is a flowchart that schematically describes a method for transaction comparison in a transaction-based dual lockstep computing system, in accordance with an embodiment of the present invention. The flowchart is executed by TCC 104 (FIG. 1).

The flowchart starts at a wait-new-transaction step 502, wherein the TCC waits for a new transaction from one of two functionally-equivalent processing cores. When a transaction is received, the TCC, in an extract ID step 504, extracts the ID field of the transaction, and then enters a Find-same-ID step 506, wherein the TCC checks if a transaction with the same ID is stored in the TCC memory 202 (FIG. 2). In some embodiments, the TCC first evaluates a hash function of the ID and then searches the table for a transaction with the same ID-hash value.

If a transaction with the same ID is stored in the memory, the TCC enters a compare transaction step 508, and compares the stored payload of the transaction (that is stored at the entry having the same ID that the new transaction has) to the payload of the new transaction (alternatively, in some embodiments the TCC may compare a hash representation of the payload with a stored hash representation of a transaction).

If, in step 508, the payloads are not equal, the TCC, in an Interrupt step 510, send an interrupt to safety controller 106 (FIG. 1), and the flowchart ends. If, in step 508, the two payloads match, the TCC will enter a remove-transaction step 512, remove the entry from transactions memory 202 (e.g., by clearing a valid field 206), and then reenter step 502, to wait for the next transaction.

If, in step 506, the ID of the new transaction is not found in memory 202, the TCC enters an add-transaction step 514, wherein the TCC adds the new transaction into memory 202 (the TCC may also set the valid field 206 of the corresponding memory entry); the TCC then reenters step 502 and waits for the next transaction.

The structure of flowchart 500 illustrated in FIG. 5 and described herein is cited by way of example. Other suitable flowcharts may be used in alternative embodiments. For example, in some embodiments memory 202 may be a contents addressable memory, and a match in the ID and the payload may be checked at the same time.

Figure 6:
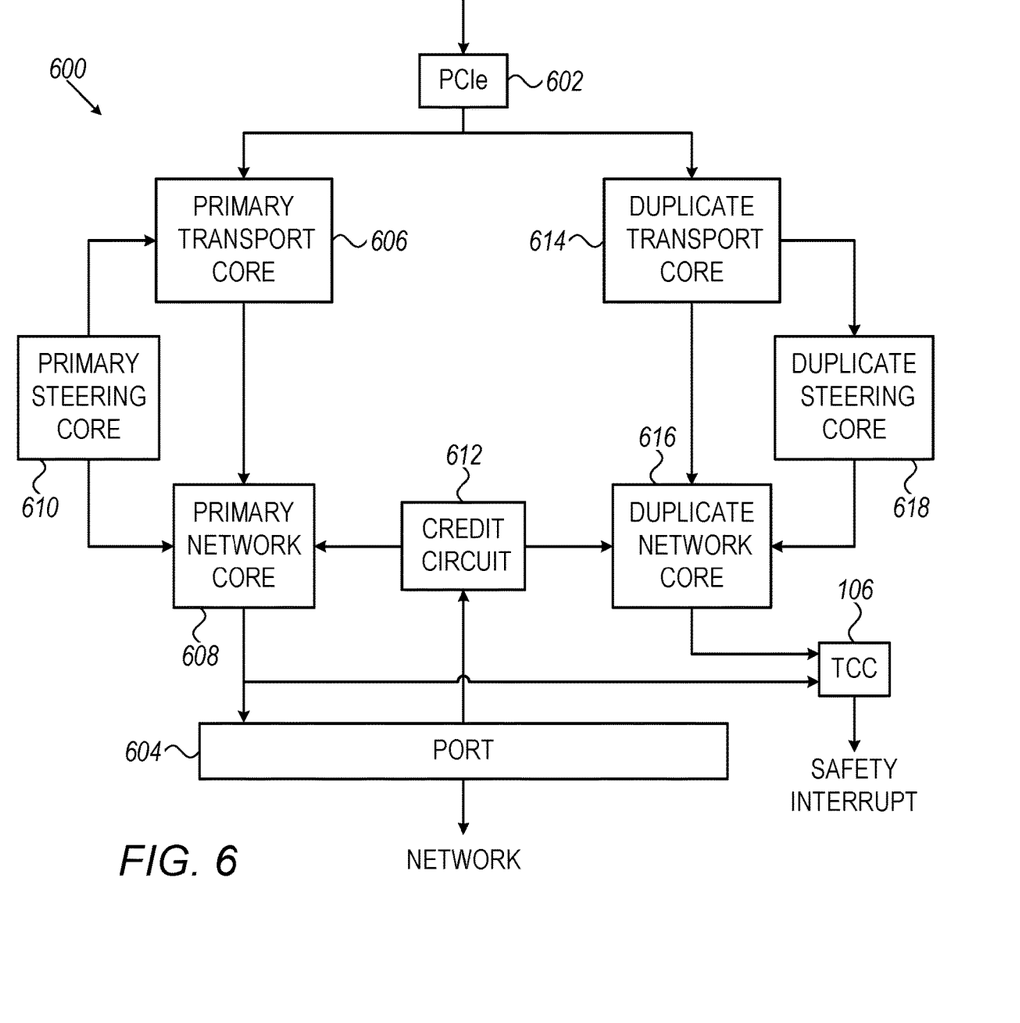
FIG. 6 is a block diagram that schematically illustrates dual lockstep egress circuitry in a network device, in accordance with an embodiment of the present invention.

FIG. 6 is a block diagram of a dual lockstep egress circuitry 600 in a network device, in accordance with an embodiment of the present invention. The network device may comprise, for example, a network adapter, a packet switch, or any other suitable type of network device. Egress circuitry 600 is configured to send packets over a network with high reliability, using duplicate processing circuits and a transaction-control circuitry (TCC). A processor (not shown) typically sends packet payloads and attributes (e.g., destination, QoS) to the egress circuitry, through a Peripheral Component Interconnect Express (PCIe) 602. The egress circuit sends the packets to a network through a port 604.

A primary datapath within the egress circuitry, from PCIe interface 602 to port 604, comprises a primary-transport-core 606, which is configured to process the packets at the transport level (layer-4); a primary-network-core 608, which is configured to process the packets at the network level (layer 3) and to send the packets to port 604; and, a primary-steering-core 610, which is configured to process the steering of the packets (the steering core controls both primary-transport-core 606 and primary-network-core 608).

For fault resiliency, a duplicate, functionally-equivalent datapath within the egress circuitry comprises circuits which are identical to counterpart circuits in the main datapath: a duplicate-transport-core 614, which is identical to primary transport core 606; a duplicate network core, which is identical to primary network core 608; and, a duplicate steering core 618, identical to primary steering core 610.

A credit-circuit 612 allows transfer of packets over the network by exchanging credits with a receiving peer that is coupled to the network (not shown); the outputs of the credit circuit are shared by primary network core 608 and duplicate network core 616.

The egress packets that duplicate network core 616 generates are not sent to port 604, as they are used for verification only. Primary network core 608 and duplicate network core 616 add ID codes to the egress packets and send the packets with the IDs to a TCC 104 (FIG. 1). The packets with the ID codes are transactions that the TCC receives. As described hereinabove, the TCC is configured to compare same-ID transactions that are not input at the same time, including transactions that the TCC receives out-of-order.

In summary, the dual-lockstep egress circuitry 600 according to the example embodiment illustrated in FIG. 6 and described hereinabove, compares the outputs of two identical paths at the transaction level, allowing for non-synchronized and out-of-order transactions. If the transactions do not match, a safety controller (not shown) is alerted.

Figure 7:
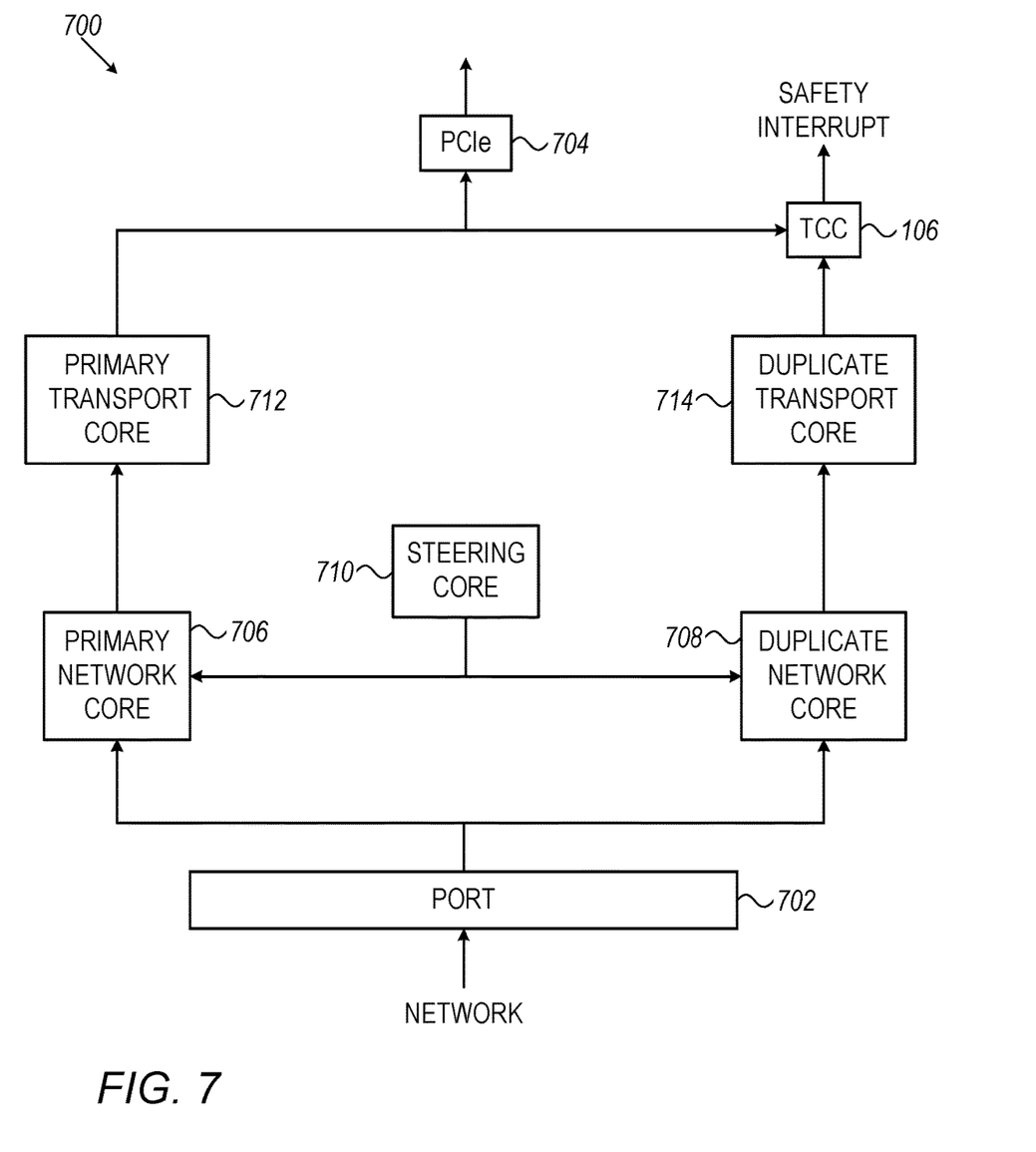
FIG. 7 is a block diagram that schematically illustrates dual lockstep ingress circuitry in a network device, in accordance with an embodiment of the present invention.

FIG. 7 is a block diagram of a dual lockstep ingress circuitry 700 in a network device, in accordance with an embodiment of the present invention. The network device may comprise, for example, a network adapter, a packet switch, or any other suitable type of network device. Ingress circuitry 700 is configured to reliably receive packets from a network, using duplicate processing circuits and a transaction-control circuitry (TCC).

Port 702 is configured to receive communication packets from the network, and to send two identical copies, to a primary-network-core 706 and to an identical, functionally-equivalent duplicate-network-core 708. The network cores perform network-level (layer 3) packet processing; a steering-core 710 controls the steering within the two network cores in an identical manner.

Primary-network-core 706 sends L3-processed packets to a primary-transport-core 712, which is configured to process the packets at the L4 level, and to output processed packets through PCIe interface 704 to a packet data sink (not shown; typically a processor).

In the duplicate, functionally-equivalent datapath, duplicate network core 708 sends the L3-processed packets to a duplicate transport core 712, which is configured to process the packets at the L4 level.

Each of primary transport core 712 and duplicate transport core 714 adds IDs to the L4-processed packets and sends the packets and IDs to TCC 104 (FIG. 1). The packets with the ID codes are transactions that the TCC receives. As described hereinabove, the TCC is configured to compare same-ID transactions that are not input at the same time, including transactions that the TCC receives out-of-order.

In summary, the dual-lockstep ingress circuitry 700 according to the example embodiment illustrated in FIG. 7 and described hereinabove, compares the inputs of two identical paths at the transport level, allowing for non-synchronized and out-of-order transactions. If the transactions do not match, a safety controller (not shown) is alerted.

The configurations of dual lockstep egress circuitry 600 and dual lockstep ingress circuitry 700, illustrated in FIGS. 6,7 and described herein are cited by way of example. Other suitable configurations may be used in alternative embodiments. For example, in some embodiments credit circuit 612 (FIG. 6) may be duplicated. In other embodiments, steering core 710 (FIG. 7) may be duplicated; and in yet other embodiments PCIe interface 602 (FIG. 6) and/or 704 (FIG. 7) may be duplicated.

In an embodiment, two independent networks, which are connected to the ingress lockstep and/or the egress lockstep circuits through two independent ports, may be used. Thus, a complete path from a source core to a sink core can be duplicated.

The configurations of fault tolerant computing system 100 including TCC 104, egress network device 600 and ingress network device 700, and the method of flowchart 500, illustrated in FIGS. 1 through 7 and described hereinabove, are example configurations and methods that are shown purely by way of illustration. Any other suitable configurations and methods can be used in alternative embodiments.

In various embodiments, the functions of TCC 104 described hereinabove may be carried out by hardware, by software, or by a combination of hardware and software.

The different elements of fault tolerant computing system 100, egress network device 600 and ingress network device 700 may be implemented using suitable hardware, such as one or more Application-Specific Integrated Circuits (ASIC) or Field-Programmable Gate Arrays (FPGA), or a combination of ASIC and FPGA.

In various embodiments, processing cores 102, network cores 608, 616, 706, 708, transport cores 606, 614, 712, and steering cores 610, 618, 710, 714 may include one or more processors; the processors typically comprise one or more general-purpose processors, which are programmed in software to carry out at least part of the functions described hereinabove. The software may be downloaded to the processor in electronic form, over a network, for example, or it may, alternatively or additionally, be provided and/or stored on non-transitory tangible media, such as magnetic, optical, or electronic memory.

Although the embodiments described herein mainly refer to fault tolerant computing, the methods and systems described herein can also be used in other applications, such as in various networking and security (e.g., fault injection prevention) applications.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A computing apparatus, comprising:
   a transaction-record memory, to store one or more transaction records comprising different respective transaction IDs and respective transaction payloads or payload hashes, the stored transaction records including: a first transaction record with a first transaction ID, and a first transaction payload or a first payload hash; and
   a comparator, to:
   receive a second transaction record, which includes a second transaction ID and a second transaction payload or a second payload hash;
   compare the second transaction ID to the transaction IDs stored in the transaction-record memory; and
   responsively to the second transaction ID equaling the first transaction ID of the first transaction record previously stored in the transaction-record memory, compare the first transaction payload or the first payload hash to the second transaction payload or the second payload hash, and remove the first transaction record from the transaction-record memory in response to a match between the second transaction payload or the second payload hash with the first transaction payload or the first payload hash.

2. The computing apparatus according to claim 1, and comprising a safety controller, wherein the comparator is to initiate the responsive action by issuing an alert to the safety controller.

3. The computing apparatus according to claim 2, wherein the safety controller comprises a processor, and wherein the comparator is to issue the alert by asserting an interrupt input of the processor.

4. The computing apparatus according to claim 1, wherein the transaction-record memory is hash-based.

5. The computing apparatus according to claim 1, further comprising at least two functionally equivalent processing cores to execute identical tasks, each processing core to output a respective sequence of transaction records to the comparator.

6. The computing apparatus according to claim 5, wherein at least two of the processing cores are not synchronized to each other.

7. The computing apparatus according to claim 5, wherein at least one of the processing cores has a non-deterministic processing latency in performing the tasks.

8. The computing apparatus according to claim 5, wherein one of the processing cores is collocated with the transaction-record memory and the comparator, and another of the processing cores is remote from the transaction-record memory and the comparator.

9. The computing apparatus according to claim 5, wherein one or more of the processing cores are comprised in a network device, and wherein the transaction records comprise communication traffic processed by the network device.

10. A computing method, comprising:
storing, in a transaction-record memory, one or more transaction records comprising different respective transaction IDs and respective transaction payloads or payload hashes, the stored transaction records including: a first transaction record with a first transaction ID, and a first transaction payload or a first payload hash;
receiving a second transaction record, which includes a second transaction ID and a second transaction payload or a second payload hash;
comparing the second transaction ID to the transaction IDs stored in the transaction-record memory; and
responsively to the second transaction equaling the first transaction ID of the first transaction record previously stored in the transaction-record memory, comparing the first transaction payload or the first payload hash to the second transaction payload or the second payload hash, and removing the first transaction record from the transaction-record memory in response to a match between the second transaction payload or the second payload hash with the first transaction payload or the first payload hash.

11. The computing method according to claim 10, wherein initiating the responsive action comprises issuing an alert to a safety controller.

12. The computing method according to claim 11, wherein issuing the alert comprises asserting an interrupt input of a processor of the safety controller.

13. The computing method according to claim 10, wherein the transaction-record memory is hash-based.

14. The computing method according to claim 10, further comprising executing identical tasks by at least two functionally equivalent processing cores, and outputting a respective sequence of transaction records by each processing core.

15. The computing method according to claim 14, wherein at least two of the processing cores are not synchronized to each other.

16. The computing method according to claim 14, wherein at least one of the processing cores has a non-deterministic processing latency in performing the tasks.

17. The computing method according to claim 14, wherein one of the processing cores is collocated with the transaction-record memory and a comparator that compares the payloads, and another of the processing cores is remote from the transaction-record memory and the comparator.

18. The computing method according to claim 14, wherein one or more of the processing cores are comprised in a network device, and wherein the transaction records comprise communication traffic processed by the network device.

19. The computing apparatus according to claim 2, wherein the safety controller is to decide which of the compared transaction payloads should be used based on a majority vote.

20. The computing method according to claim 10, further comprising deciding which of the compared transaction payloads should be used based on a majority vote.

* * * * *